United States Patent [19]

Guaraldi et al.

[11] Patent Number: 5,484,212
[45] Date of Patent: Jan. 16, 1996

[54] METHOD OF LUBRICATING PRINTING CYCLINDER BEARINGS

[75] Inventors: Glenn A. Guaraldi, Kingston; David C. Burke, Portsmouth, both of N.H.

[73] Assignee: Heidelberg Druckmaschinen AG, Heidelberg, Germany

[21] Appl. No.: 182,804

[22] Filed: Jan. 14, 1994

[51] Int. Cl.⁶ .............................. F16C 19/26; F16C 37/00
[52] U.S. Cl. .......................... 384/462; 384/471; 101/216; 29/898.1; 184/6.26; 184/55.1
[58] Field of Search ................................... 101/216, 348, 101/DIG. 38; 184/6.22, 6.26, 55.1; 384/462, 464, 471; 29/898.1

[56] References Cited

U.S. PATENT DOCUMENTS

| | | | |
|---|---|---|---|
| 3,042,462 | 7/1962 | Rosskopf | 184/6.26 |
| 3,797,898 | 3/1974 | Juichi | 384/471 |
| 4,343,378 | 8/1982 | Bremer | 184/55.1 |
| 5,205,377 | 4/1993 | Pfarrwaller et al. | 184/55.1 |
| 5,241,905 | 9/1993 | Guaraldi et al. | 101/216 |

*Primary Examiner*—Stephen Funk
*Attorney, Agent, or Firm*—Tarolli, Sundheim & Covell

[57] ABSTRACT

A method of lubricating a bearing (58) in a printing unit (14) includes the step of directing a quantity of grease into the bearing (58), and the step of directing pressurized air into contact with the grease. The bearing (58) supports a printing cylinder (16) for rotation in the printing unit (14), and includes a plurality of rolling elements (100) between a pair of opposed bearing race surfaces (94, 88). A predetermined quantity (160) of grease is directed to flow from a hydraulic pump (114) to the space between the bearing race surfaces (94, 88). The pressurized air is directed to flow from a pneumatic pump (132) into contact with the grease to remove a first portion of the predetermined quantity (160) of grease from the space between the bearing race surfaces (94, 88). The pressurized air further spreads a second portion of the predetermined quantity (160) of grease into coatings (190) which extend over the rolling element surfaces (104) and the bearing race surfaces (94, 88).

2 Claims, 3 Drawing Sheets

METHOD OF LUBRICATING PRINTING CYCLINDER BEARINGS

FIELD OF THE INVENTION

The present invention relates to a printing press having printing cylinders and bearings which support the printing cylinders for rotation, and particularly relates to a method of lubricating the bearings.

BACKGROUND OF THE INVENTION

A printing press typically includes a plurality of printing units which have rotatable cylinders. The cylinders print images onto a web moving longitudinally through the printing units. A printing unit in an offset lithographic printing press, for example, includes a plate cylinder which carries a printing plate and a blanket cylinder which carries a printing blanket. The plate cylinder and the blanket cylinder are supported to rotate in bearings. The printing blanket transfers inked images from the printing plate to the web when the cylinders rotate in the bearings during a printing operation.

Printing units in an offset lithographic printing press are known to include lubricating systems for lubricating the bearings. The lubricating system in such a printing unit includes a grease reservoir, a pump for pumping grease, and a plurality of grease conduits for conveying grease from the grease reservoir to the bearings under the influence of the pump. The pump is actuated periodically during a printing operation to supply quantities of grease which lubricate the bearings.

SUMMARY OF THE INVENTION

The present invention is a method of lubricating a bearing which supports a printing cylinder for rotation in a printing unit. The bearing includes a plurality of rolling elements between a pair of opposed bearing race surfaces. The rolling elements have surfaces supported in rolling contact with the bearing race surfaces. The method comprises the step of directing a quantity of grease to flow into the space between the bearing race surfaces under pressure supplied from a first source of pressure, and the step of directing pressurized air to flow into contact with the grease under pressure supplied from a second source of pressure. The pressurized air removes a first portion of the grease from the space between the bearing race surfaces. The pressurized air further spreads a second portion of the grease into coatings which extend over the rolling element surfaces and the bearing race surfaces.

The foregoing steps are preferably performed at timed intervals while the bearing race surfaces are rotating relative to each other during a printing operation. The method practiced in accordance with the present invention thus enables the printing operation to be performed at high speeds and to continue for extended periods of time without the occurrence of excessive heat and friction in the bearings.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

Figure 1:
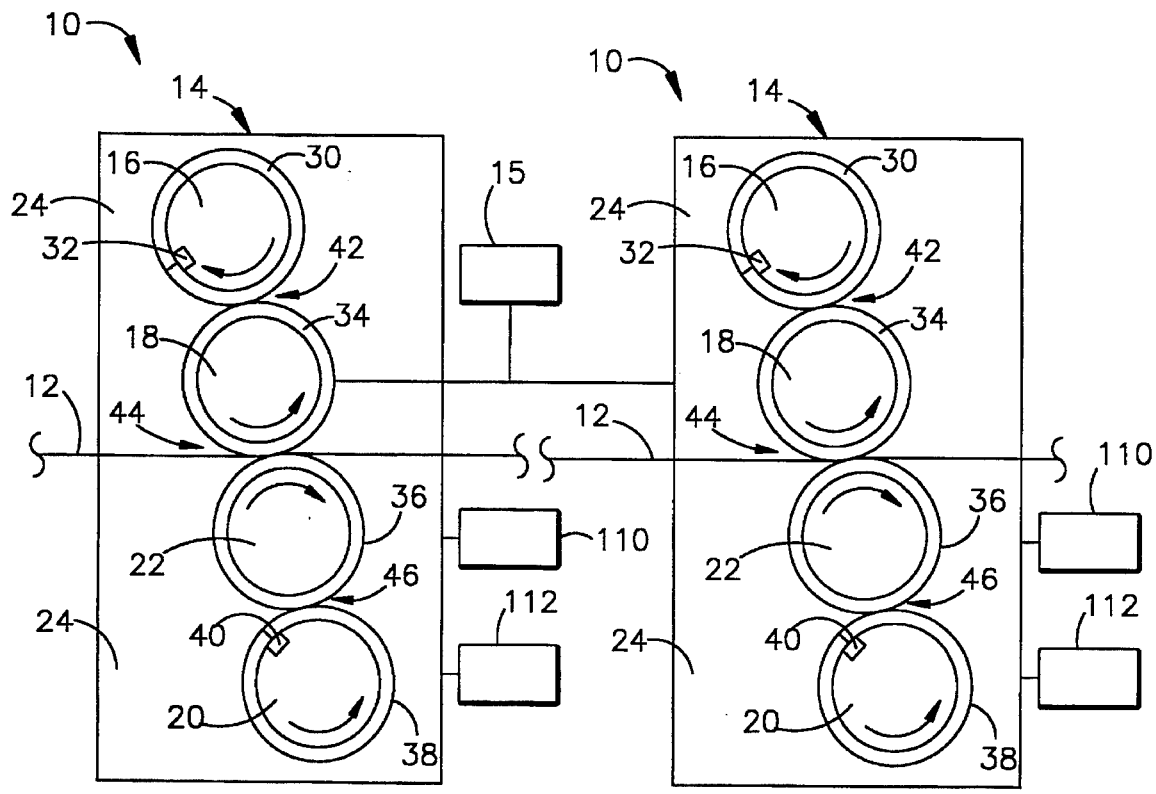
FIG. 1 is a schematic view of a printing press comprising a first embodiment of the present invention.

A printing press 10 comprising a preferred embodiment of the present invention is shown schematically in FIG. 1. The printing press 10, by way of example, is an offset lithographic printing press for printing on opposite sides of a web 12. The printing press 10 includes a plurality of printing units 14 and a motor 15. Each of the printing units 14 includes an upper plate cylinder 16 and an upper blanket cylinder 18 above the web 12, and a lower plate cylinder 20 and a lower blanket cylinder 22 below the web 12. The cylinders 16–22 in each printing unit are supported for rotation in a frame having a pair of side walls 24. Each of the printing units 14 further includes a gear train (not shown) which is driven by the motor 15 to rotate the cylinders 16–22 as indicated by the arrows shown in FIG. 1. The motor 15 and the gear trains are constructed as known in the art.

The upper plate cylinder 16 in each printing unit 14 carries a printing plate 30 which defines an image to be printed. The printing plate 30 is formed as a thin metal sheet, and is mounted on the upper plate cylinder 16 by wrapping the sheet around the upper plate cylinder 16. A locking mechanism 32 in the upper plate cylinder 16 holds the printing plate 30 securely on the upper plate cylinder 16. The upper blanket cylinder 18 carries a printing blanket 34. The printing blanket 34 is preferably formed as a tube which is mounted on the upper blanket cylinder 18 by sliding the tube telescopically over the upper blanket cylinder 18. Another printing blanket 36, which also is preferably formed as a tube, is similarly mounted on the lower blanket cylinder 22. Another printing plate 38 is held on the lower plate cylinder 20 by a locking mechanism 40.

When the cylinders 16–22 in a printing unit 14 are rotating during a printing operation, ink is applied to the printing plates 30 and 38 to form inked images on the printing plates 30 and 38. The inked image on the upper printing plate 30 is transferred to the upper printing blanket 34 at the nip 42 between the upper plate cylinder 16 and the upper blanket cylinder 18. The upper printing blanket 34 subsequently transfers the inked image to the upper side surface of the web 12 at the nip 44 between the upper and lower blanket cylinders 18 and 22. The lower printing plate 38 transfers its inked image to the lower printing blanket 36 at the nip 46 between the lower plate cylinder 20 and the lower blanket cylinder 22. The lower printing blanket 36 subsequently transfers that inked image to the lower side surface of the web 12 at the nip 44. The printing unit 14 thus prints simultaneously on opposite sides of the web 12.

Figure 2:
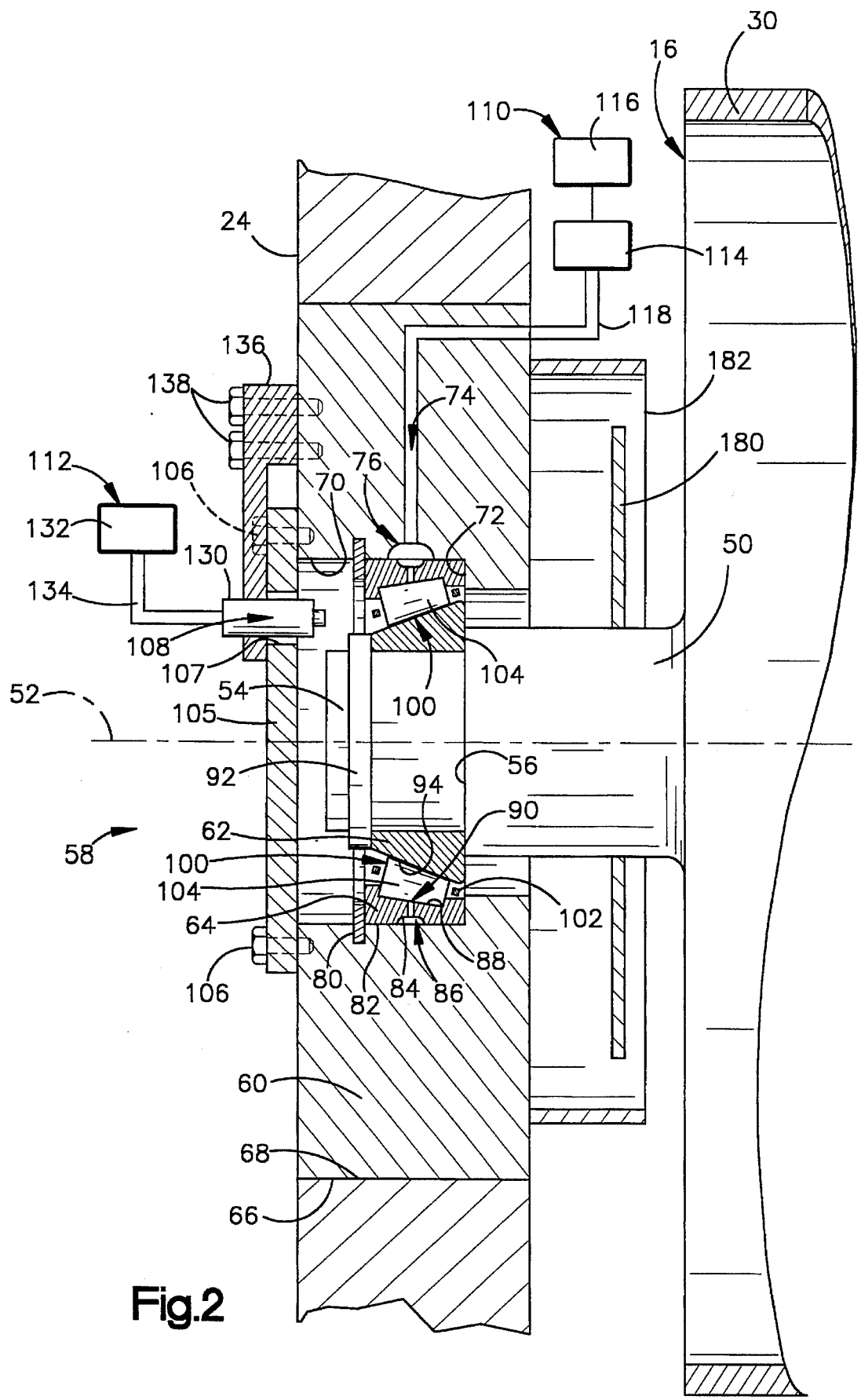
FIG. 2 is a view of parts of the apparatus of FIG. 1.

One end of an upper plate cylinder 16 is shown in FIG. 2. This end of the upper plate cylinder 16 has a stub shaft 50 centered on the longitudinal central axis 52 of the cylinder 16. The stub shaft 50 has a reduced diameter end portion 54 and a circular shoulder surface 56. A bearing assembly 58 is connected with the stub shaft 50 and supports the stub shaft 50 for rotation about the axis 52. The bearing assembly 58 thus supports the end of the upper plate cylinder 16 to rotate in a printing operation as described above.

The bearing assembly 58 includes a bearing support member 60, an inner ring 62 and an outer ring 64. The bearing support member 60 has an outer surface 66 which adjoins an inner surface 68 of the adjacent side wall 24. The bearing support member 60 can be movable axially relative to the side wall 24 for axial adjustment of the position of the upper plate cylinder 16 in a known manner, but is normally stationary relative to the side wall 24 during a printing operation. The bearing support member 60 further has a cylindrical inner surface 70 and a circular shoulder surface 72 centered on the axis 52. A grease passage 74 extends through the bearing support member 60, and has an enlarged open end portion 76 at the cylindrical inner surface 70.

In the illustrated embodiment, the outer ring 64 is mounted on the bearing support member 60 and is secured against rotation relative to the bearing support member 60. Specifically, the outer ring 64 is held between a split ring 80 and the shoulder surface 72 of the bearing support member 60, and has a cylindrical outer surface 82 which adjoins the cylindrical inner surface 70 of the bearing support member 60 in a tight fit. A recessed portion 84 of the cylindrical outer surface 82 defines a circumferentially extending groove 86.

The outer ring 64 further has a tapered cylindrical inner surface which defines an outer bearing race surface 88 centered on the axis 52. A plurality of grease passages 90 extend radially through the outer ring 64 between the groove 86 and the outer bearing race surface 88. In the preferred embodiment of the invention, the outer ring 64 has a total of four such grease passages 90 which are spaced from each other 90° about the axis 52.

The inner ring 62 is received closely over the reduced diameter end portion 54 of the stub shaft 50, and is held securely on the reduced diameter end portion 54 between a split ring 92 and the shoulder surface 56 of the stub shaft 50. The inner ring 62 is thus mounted on the stub shaft 50 to rotate about the axis 52 with the stub shaft 50. A tapered cylindrical outer surface of the inner ring 62 defines an inner bearing race surface 94 centered on the axis 52 at a location radially opposite the outer bearing race surface 88.

A plurality of tapered rolling elements 100 are supported between the inner and outer rings 62 and 64 by a retainer 102. Each of the rolling elements 100 has a tapered cylindrical surface 104 disposed in rolling contact with the inner and outer bearing race surfaces 94 and 88.

A cover plate 105 on the outer side of the bearing support member 60 closes the opening defined within the cylindrical inner surface 70, and is fixed to the bearing support member 60 by fasteners 106. The cover plate 105 has an inner edge surface 107 defining an opening 108 extending though the cover plate 105.

As shown schematically in FIGS. 1 and 2, each printing unit 14 further includes a lubricating system 110 and an air pressure system 112. Each lubricating system 110 includes a grease reservoir 114 and a pump 116 for pumping grease (FIG. 2), both of which are constructed as known in the art. When the pump 116 is actuated, it directs grease to flow from the grease reservoir 114 through a grease conduit 118, from the grease conduit 118 to the grease passage 74 in the bearing support member 60, and from the open end 76 of the grease passage 74 to the groove 86 at the periphery of the outer ring 64. The grease flows through the groove 86 and the grease passages 90 to the space between the inner and outer rings 62 and 64. A predetermined quantity of grease is thus delivered to the space between the inner and outer rings 62 and 64 when the pump 116 is actuated.

Each of the air pressure systems 112 includes an air nozzle 130 and a source of pneumatic pressure 132 (FIG. 2) which may comprise a compressor, a tank of compressed air, or the like. The source of pneumatic pressure 132 communicates with the nozzle 130 through a pneumatic conduit 134. The nozzle 130 extends through the opening 108 in the cover plate 105, and is held in place by a bracket 136 which is mounted on the bearing support member 60 by bolts 138. When the source of pneumatic pressure 132 is actuated, a stream of pressurized air is directed from the nozzle 130 to the space between the inner and outer rings 62 and 64 in a direction generally parallel to the axis 52. The nozzle 130, the source of pneumatic pressure 132, and the pneumatic conduit 134 are parts which are individually known in the art.

Figure 3:
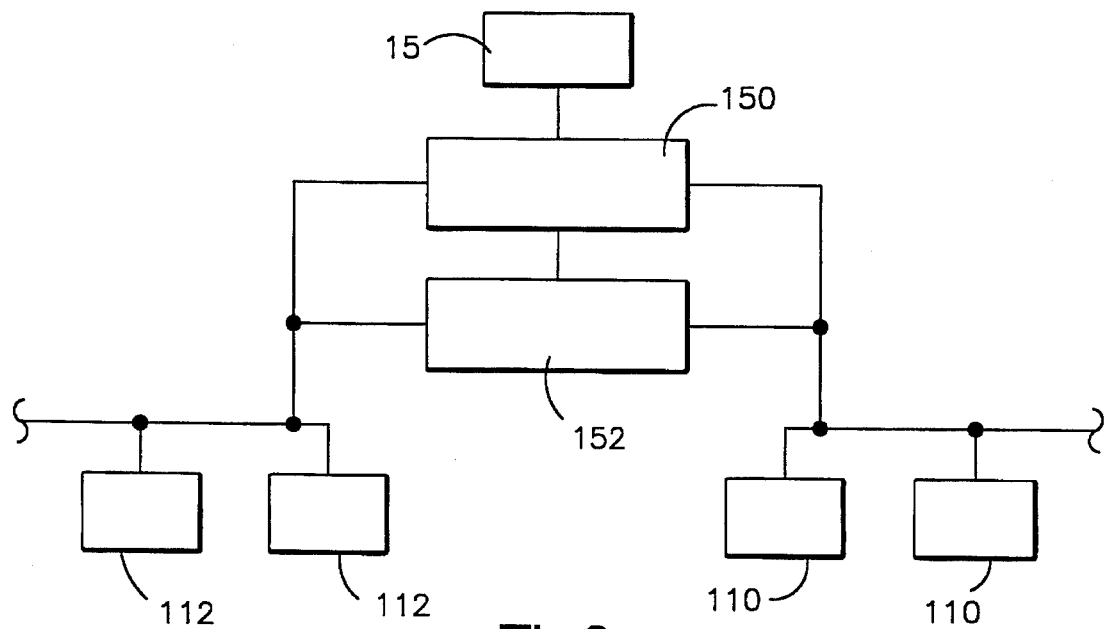
FIG. 3 is a schematic view of parts of the apparatus of FIG. 1.

As shown in FIG. 3, the printing press 10 further includes a controller 150 which operates the motor 15, the lubricating systems 110 and the air pressure systems 112 in the printing units 14. The controller 150 also is of known construction, and comprises an instrument panel (not shown) with which an operator of the printing press 10 can direct operation of the motor 15, the lubricating systems 110 and the air pressure systems 112. The controller 150 enables the operator of the printing press 10 to operate the lubricating systems 110 and the air pressure systems 112 either directly or under the influence of a timer 152.

When the cylinders 16–22 are rotating in a printing unit 14 during a printing operation, as described above with reference to FIG. 1, the inner bearing race surface 94, the surfaces 104 of the rolling elements 100, and the outer bearing race surface 88 in the bearing assembly 58 are maintained in a lubricated condition by grease supplied from the associated lubricating system 110. In the method practiced in accordance with the present invention, those surfaces are lubricated with grease and are maintained in a lubricated condition upon performance of the following steps.

Figure 4:
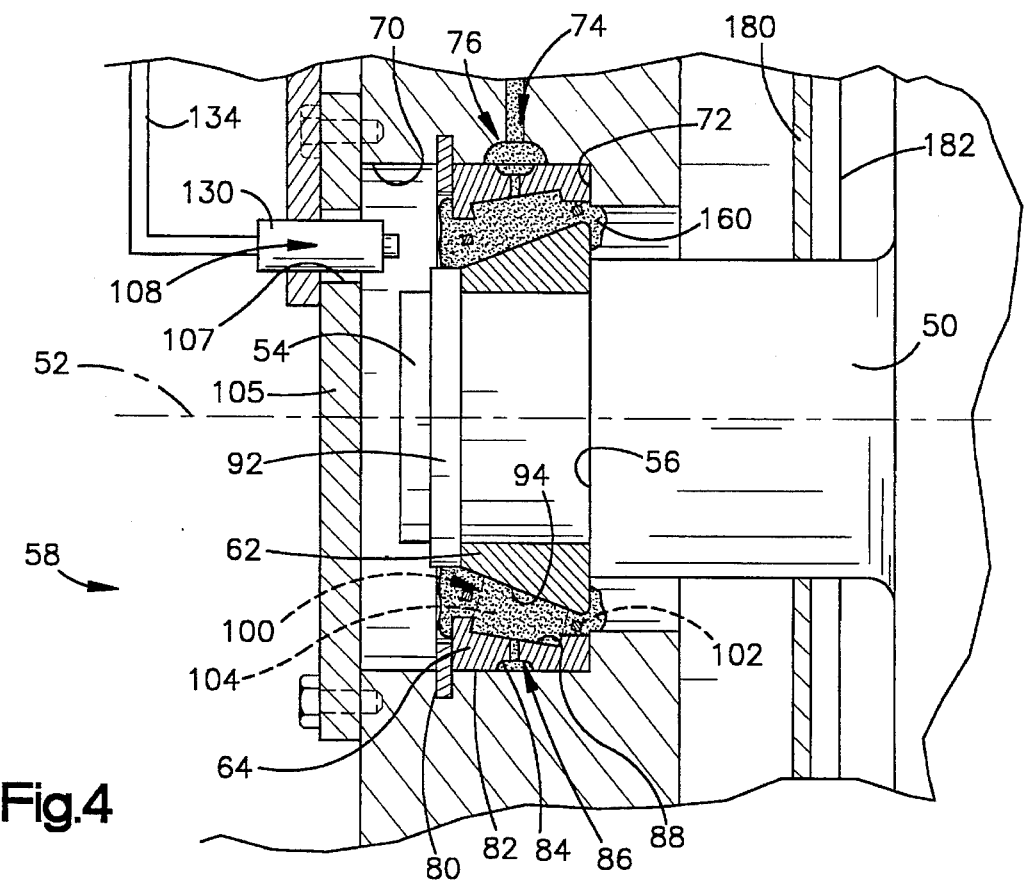
FIG. 4 is an enlarged partial view of parts shown in FIG. 2.

First, while the cylinders 16–22 are rotating in a printing unit 14 during a printing operation, the pump 116 in the lubricating system 110 is actuated and directs a predetermined quantity of grease into the space between the inner and outer rings 62 and 64, as described above. The grease is moved throughout the space between the rings 62 and 64 by the inner bearing race surface 94 and by the surfaces 104 of the rolling elements 100 as the inner ring 62 and the rolling elements 100 rotate within the outer ring 64. An initial load 160 of grease is thus applied as shown in FIG. 4.

Figure 5:
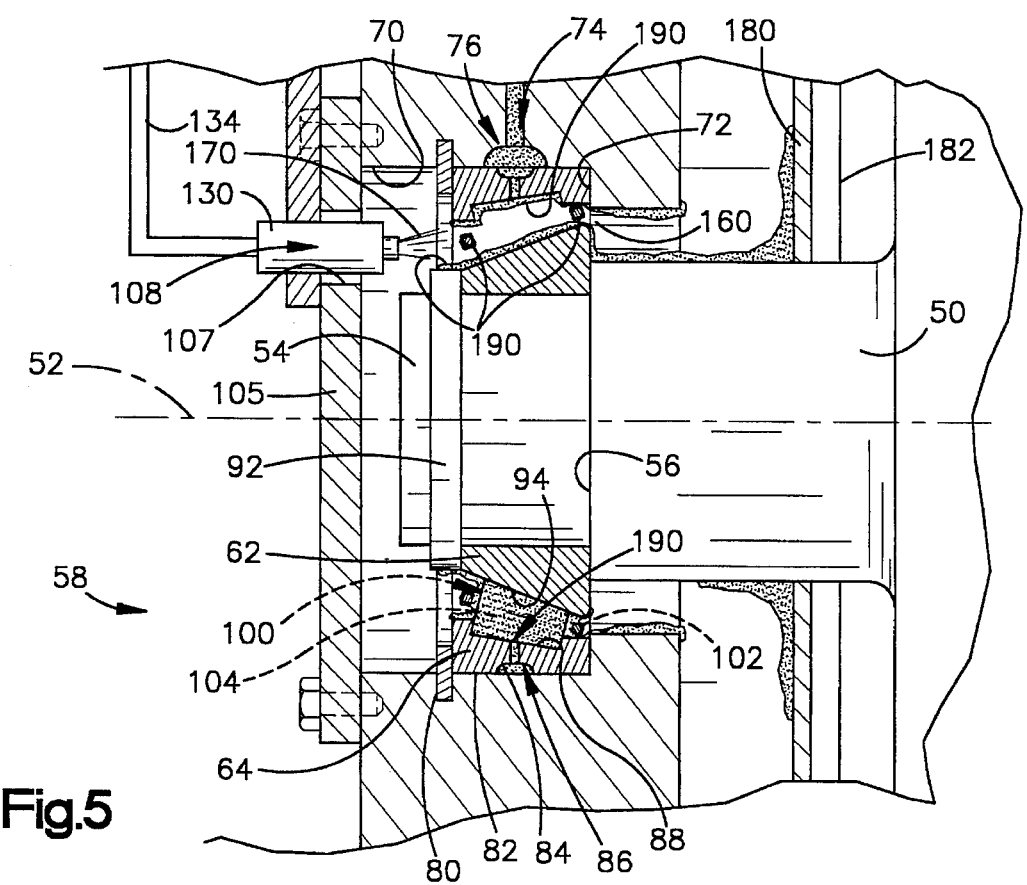
FIG. 5 is a view of the parts of FIG. 4 in a different condition.

Following application of the initial load 160 of grease, the source of pneumatic pressure 132 in the air pressure system 112 is actuated to direct a stream 170 of pressurized air from the nozzle 130 to the space between the inner and outer rings 62 and 64, as indicated schematically in FIG. 5. The stream 170 of pressurized air moves forcefully between the inner and outer rings 62 and 64. As a result, the grease that is located in the path of the stream 170 is blown out of the space between the rings 62 and 64 by the stream 170, and is carried axially inward over the stub shaft 50. A circular slinger 180 on the stub shaft 50 blocks the blown out grease from moving axially inward of the stub shaft 50, and slings it radially outward to a cylindrical grease collecting shield 182 which surrounds the slinger 180. As the inner ring 62 continues to rotate within the outer ring 64, a major portion of the initial load 160 of grease is thus expelled from the space between the rings 62 and 64. However, a substantial portion of the initial load 160 of grease remains between the rings 62 and 64. The stream 170 of pressurized air spreads the remaining portion of the initial load 160 over the inner bearing race surface 94, the outer bearing race surface 88, and the surfaces 104 of the rolling elements 100 in the form of coatings 190, as shown in FIG. 5. The coatings 190 could alternatively be formed by directing the stream 170 of pressurized air between the rings 62 and 64 while the initial load 160 of grease is being applied, but are preferably formed after the initial load 160 is applied.

As the cylinders 16–22 continue to rotate during the printing operation, the coatings 190 of grease lubricate the rolling surfaces in the bearing assembly 58 sufficiently to avoid excessive friction and heat, and are found to do so more effectively than a full body of grease like the initial load 160. This is because the coatings 190 retain less heat, and contribute less fluid friction, in comparison with the initial load 160. For example, in one test of the present invention, a bearing lubricated in accordance with the prior art reached a temperature of approximately 130° F. after running for two to three hours. After seven hours, a stream of pressurized air was directed against the grease in the bearing to spread the grease into coatings in accordance with the present invention. The temperature of the bearing then dropped to approximately 95° F. throughout the next two hours of operation. This example illustrates the improvement over prior art lubricating methods which is achieved by the present invention. In practice, it is preferred to form the coatings of grease earlier in a printing operation to prevent the bearing from reaching the higher temperatures reached in the prior art. The coatings are most preferably formed immediately following the application of the initial load of grease so that the bearing does not contain a full body of grease for any substantial period of time during a printing operation.

Further in accordance with the present invention, the foregoing steps which result in formation of the coatings 190 are repeated periodically throughout a printing operation to replenish the coatings 190 without stopping the printing operation. The heat and fluid friction between the rolling surfaces in the bearing assembly 58 are thus maintained at low levels throughout the printing operation. In accordance with this feature of the invention, the operator of the printing press 10 can direct the controller 150 to operate the lubricating systems 110 and the air pressure systems 112 automatically at predetermined time intervals under the influence of the timer 152.

The invention has been described with specific reference to a single bearing assembly 58 at one end of an upper plate cylinder 16 in a printing unit 14. However, the invention is equally applicable to other bearing assemblies supporting other ends of printing cylinders for rotation in a typical manner.

From the above description of the invention, those skilled in the art will perceive improvements, changes and modifications. Such improvements, changes and modifications within the skill of the art are intended to be covered by the appended claims.

Having described the invention, the following is claimed:

1. A method of lubricating an apparatus including a first rotatable member (16), a second rotatable member (18), and bearing means for supporting the rotatable members (16, 18) to rotate, the bearing means including a bearing (58) having a plurality of rolling elements (100) in the space between a pair of opposed bearing race surfaces (88, 94) which rotate relative to each other upon rotation of the rotatable members (16, 18), the rolling elements (100) having surfaces (104) supported in rolling contact with the bearing race surfaces (88, 94), said method comprising the steps of:

a) rotating the rotatable members (16, 18);

b) initiating and subsequently terminating a flow of substantially air-free grease into the space between the bearing race surfaces (88, 94) while the rotatable members (16, 18) continue to rotate, said flow of grease being terminated when an initial quantity (160) of grease has thereby been placed in said space, said initial quantity (160) of grease comprising a full load of grease which extends throughout said space; and c) initiating and subsequently terminating a flow of grease-free pressurized air into said space while the rotatable members (16, 18) continue to rotate, said flow of pressurized air being initiated after said initial quantity (160) of grease is placed in said space and thus being directed against said full load of grease;

said flow of pressurized air spreading a first portion of said initial quantity (160) of grease into coatings (190) which extend over the rolling element surfaces (104) and the bearing race surfaces (88, 94), said flow of pressurized air removing a second portion of said initial quantity (160) of grease from said space, said second portion of said initial quantity (160) comprising substantially all of said initial quantity (160) which is not included in said coatings (190).

2. A method as defined in claim 1 wherein steps b) and c) are repeated at predetermined time intervals while the rotatable members (16, 18) continue to rotate.

* * * * *